(12) United States Patent
Smith

(10) Patent No.: US 9,229,874 B2
(45) Date of Patent: Jan. 5, 2016

(54) APPARATUS AND METHOD FOR COMPRESSING A MEMORY ADDRESS

(71) Applicant: Intel Corporation, Santa Clara, CA (US)

(72) Inventor: Peter J. Smith, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 20 days.

(21) Appl. No.: 14/040,364

(22) Filed: Sep. 27, 2013

(65) Prior Publication Data
US 2015/0095609 A1    Apr. 2, 2015

(51) Int. Cl.
*G06F 12/10* (2006.01)
*G06F 9/35* (2006.01)

(52) U.S. Cl.
CPC *G06F 12/10* (2013.01); *G06F 9/35* (2013.01); *G06F 2212/401* (2013.01)

(58) Field of Classification Search
CPC ...... G06F 21/10; G06F 9/35; G06F 2212/401
See application file for complete search history.

(56) References Cited

U.S. PATENT DOCUMENTS

| | | | | |
|---|---|---|---|---|
| 5,724,538 | A  * | 3/1998 | Morris et al. | 711/206 |
| 7,126,948 | B2 * | 10/2006 | Gooch et al. | 370/392 |
| 2006/0206686 | A1* | 9/2006 | Banerjee et al. | 711/205 |
| 2011/0040950 | A1* | 2/2011 | Handgen | 711/206 |

* cited by examiner

*Primary Examiner* — Eric Oberly
(74) *Attorney, Agent, or Firm* — Nicholson De Vos Webster & Elliott LLP

(57) ABSTRACT

An apparatus and method for converting between a full memory address and a compressed memory address. For example, one embodiment comprises one or more translation tables having a plurality of translation entries, each translation entry identifiable with a pointer value and storing a portion of a full memory address usable within the processor to address data and instructions; and address translation logic to use the translation tables to convert between the full address and a compressed version of the full address, the compressed version of the full address having the pointer value substituted for the portion of the full memory address, wherein a first portion of the processor performs operations using the compressed version of the full address and a second portion of the processor performs operations using the full address.

16 Claims, 12 Drawing Sheets

APPARATUS AND METHOD FOR COMPRESSING A MEMORY ADDRESS

BACKGROUND

1. Field of the Invention

This invention relates generally to the field of computer processors. More particularly, the invention relates to an apparatus and method for compressing a memory address.

2. Description of the Related Art

The maximum memory space supported by a CPU can be determined by the number of bits needed to uniquely identify a specific byte. Each instruction or data byte within a CPU is associated with its external memory address, so this mapping is needed in many structures such as caches and pipeline buffers. Due to the quantity and usage of these bits, an implementation that modifies the supported memory space can significantly impact factors such as frequency, area, and power. Therefore the virtual memory space supported by x86 processors is currently limited to 48-bits due to the cost of these physical constraints.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments described below. It will be apparent, however, to one skilled in the art that the embodiments may be practiced without some of these specific details. In other instances, well-known structures and devices are shown in block diagram form to avoid obscuring the underlying principles of the embodiments.

Exemplary Processor Architectures and Data Types

Figure 1:
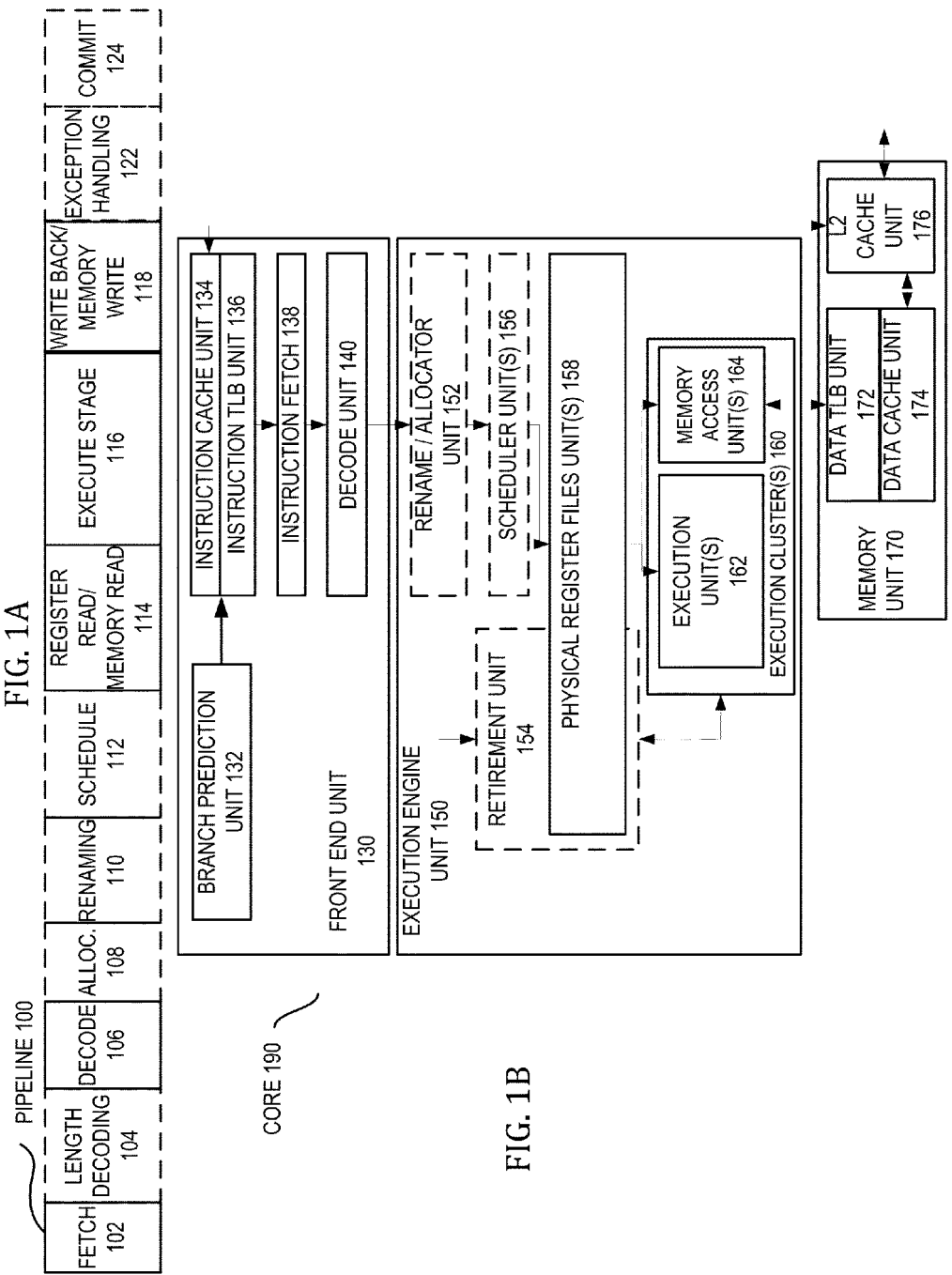
FIG. 1A is a block diagram illustrating both an exemplary in-order pipeline and an exemplary register renaming, out-of-order issue/execution pipeline according to embodiments.
FIG. 1B is a block diagram illustrating both an exemplary embodiment of an in-order architecture core and an exemplary register renaming, out-of-order issue/execution architecture core to be included in a processor according to embodiments.

FIG. 1A is a block diagram illustrating both an exemplary in-order pipeline and an exemplary register renaming, out-of-order issue/execution pipeline according to embodiments. FIG. 1B is a block diagram illustrating both an exemplary embodiment of an in-order architecture core and an exemplary register renaming, out-of-order issue/execution architecture core to be included in a processor according to embodiments. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
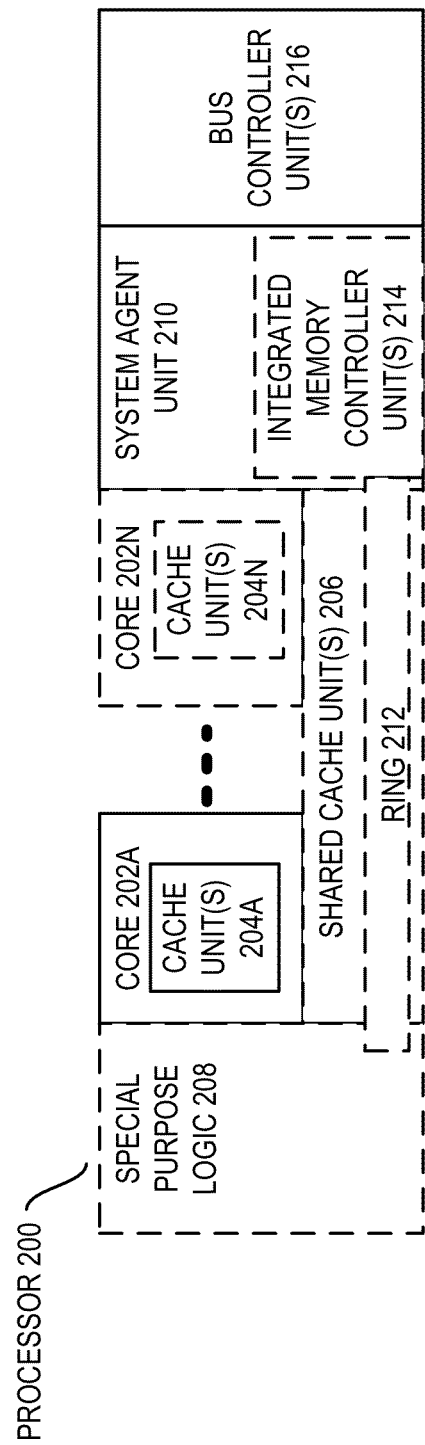
FIG. 2 is a block diagram of a single core processor and a multicore processor with integrated memory controller and graphics according to embodiments.

FIG. 2 is a block diagram of a processor 200 that may have more than one core, may have an integrated memory controller, and may have integrated graphics according to embodiments. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
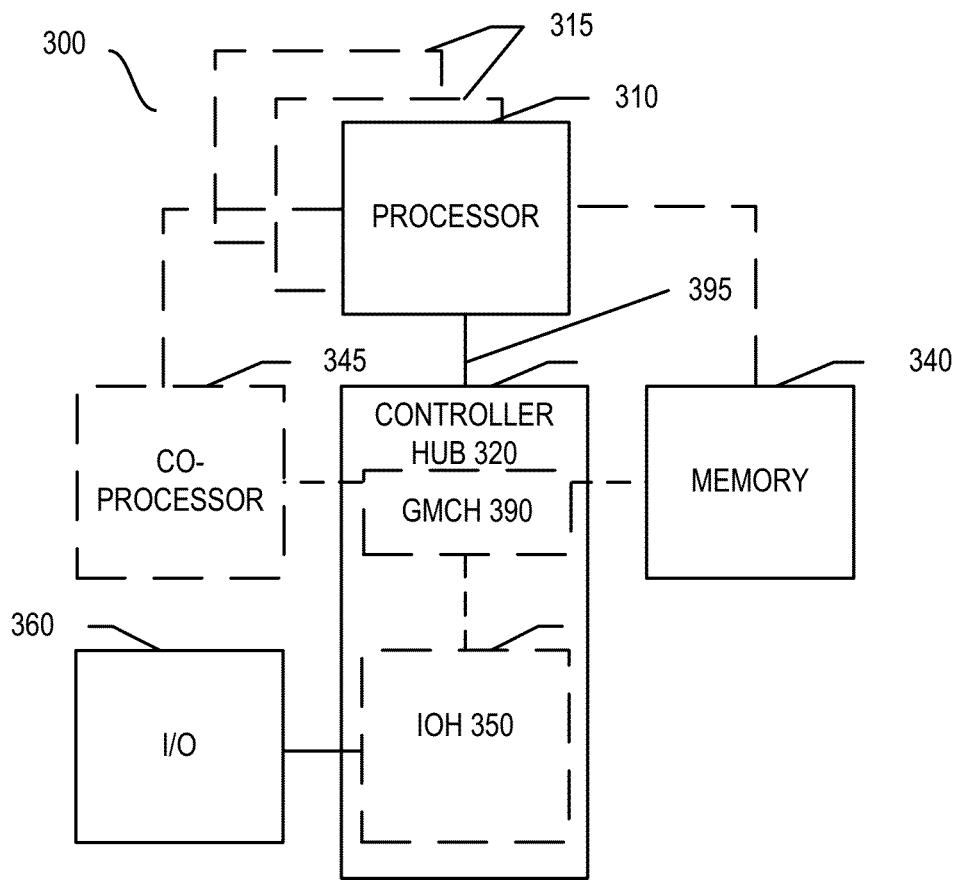
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. Each of the processors 310, 315 may include a plurality or virtual cores as described below with respect to FIGS. 8-14. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350. In one embodiment, the system memory 340 is configured on a common die with the processors 310, 315.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
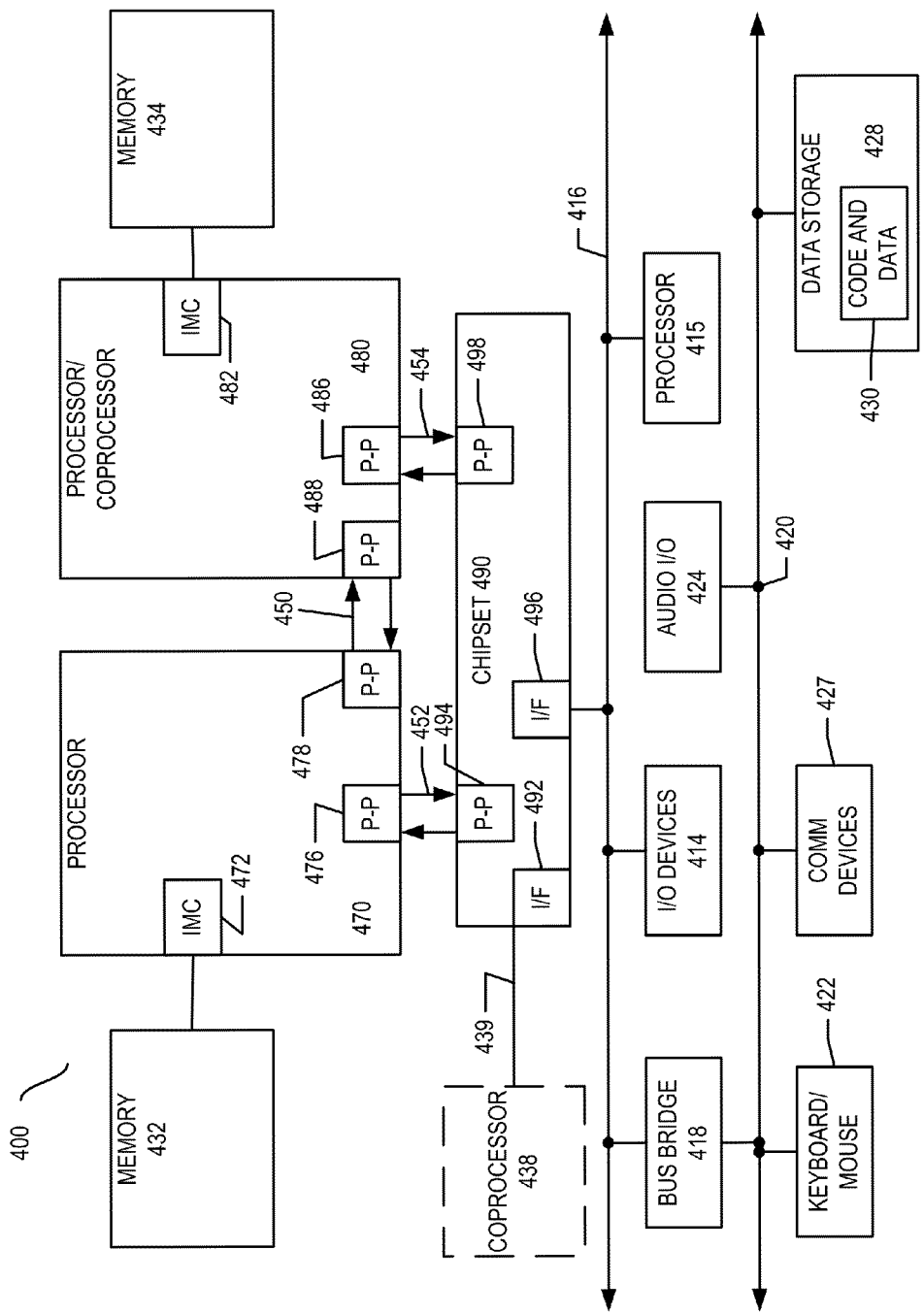
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
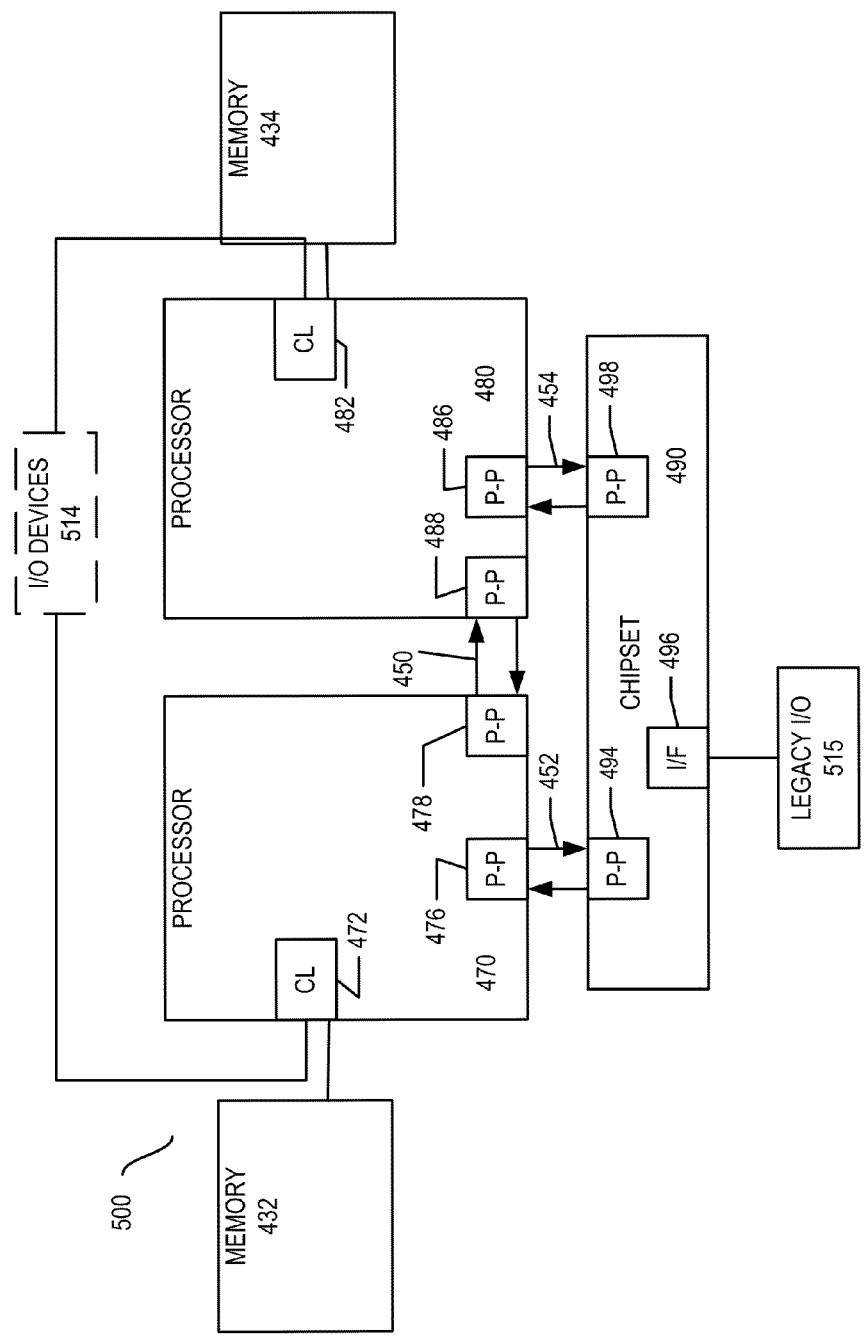
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
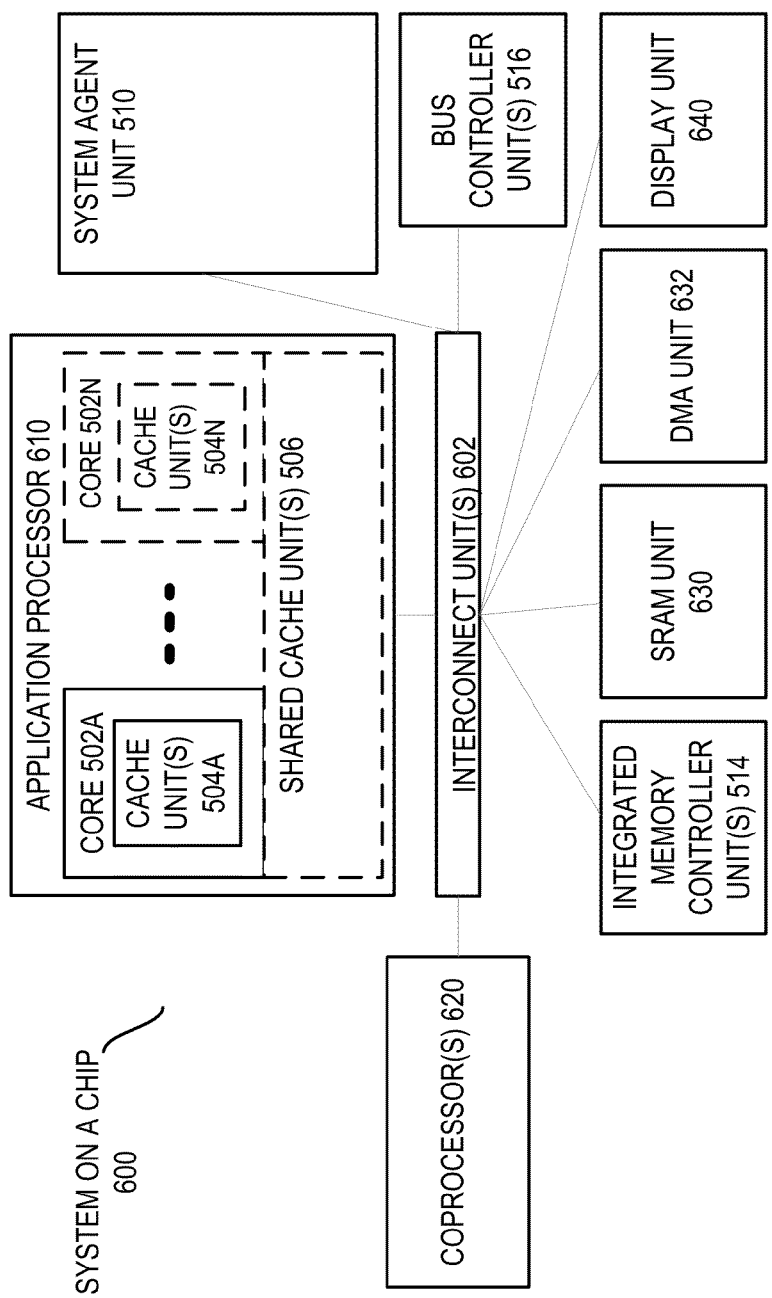
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
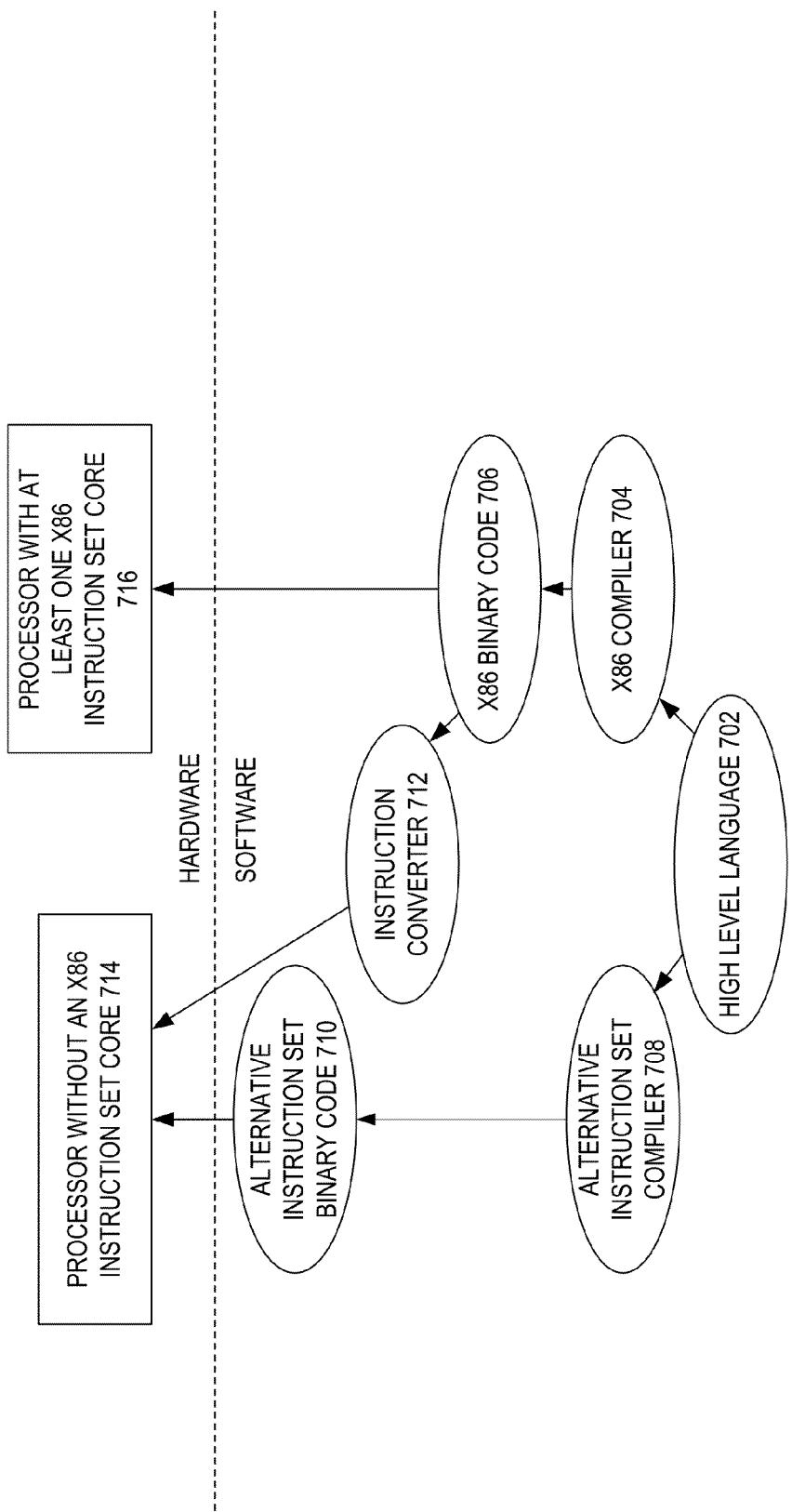
FIG. 7 illustrates a block diagram contrasting the use of a software instruction converter to convert binary instructions in a source instruction set to binary instructions in a target instruction set according to embodiments.

FIG. 7 is a block diagram contrasting the use of a software instruction converter to convert binary instructions in a source instruction set to binary instructions in a target instruction set according to embodiment. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Compressing Memory Addresses

One embodiment includes a mechanism to internally compress addresses within a processing unit such as a central processing unit (CPU). When a byte enters the CPU, part of its address may be stored in a lookup table used to convert between different address widths. Based on the concept of spatial locality, many internal bytes being processed within the CPU share the same upper address bits, so relatively few table entries may be needed to provide translations for the contents of many internal structures. In one embodiment, address bits are stored in the lookup table within the CPU and are replaced with a pointer to the corresponding entry in the table. The resulting reduction in address bits is the number of address bits stored in an entry minus the number of bits needed to reference the table:

Internal Address=Full-address–Bits-per-entry+$\log_2$(Table-entries)

In one embodiment, the full addresses are used in general purpose architectural registers (e.g., as controlled by software), and will be compressed using the translation table when the CPU determines that a value will be used internally as a memory address. Internal compressed memory addresses are subsequently decompressed by the translation table before they are used to access external memory.

Figure 8:
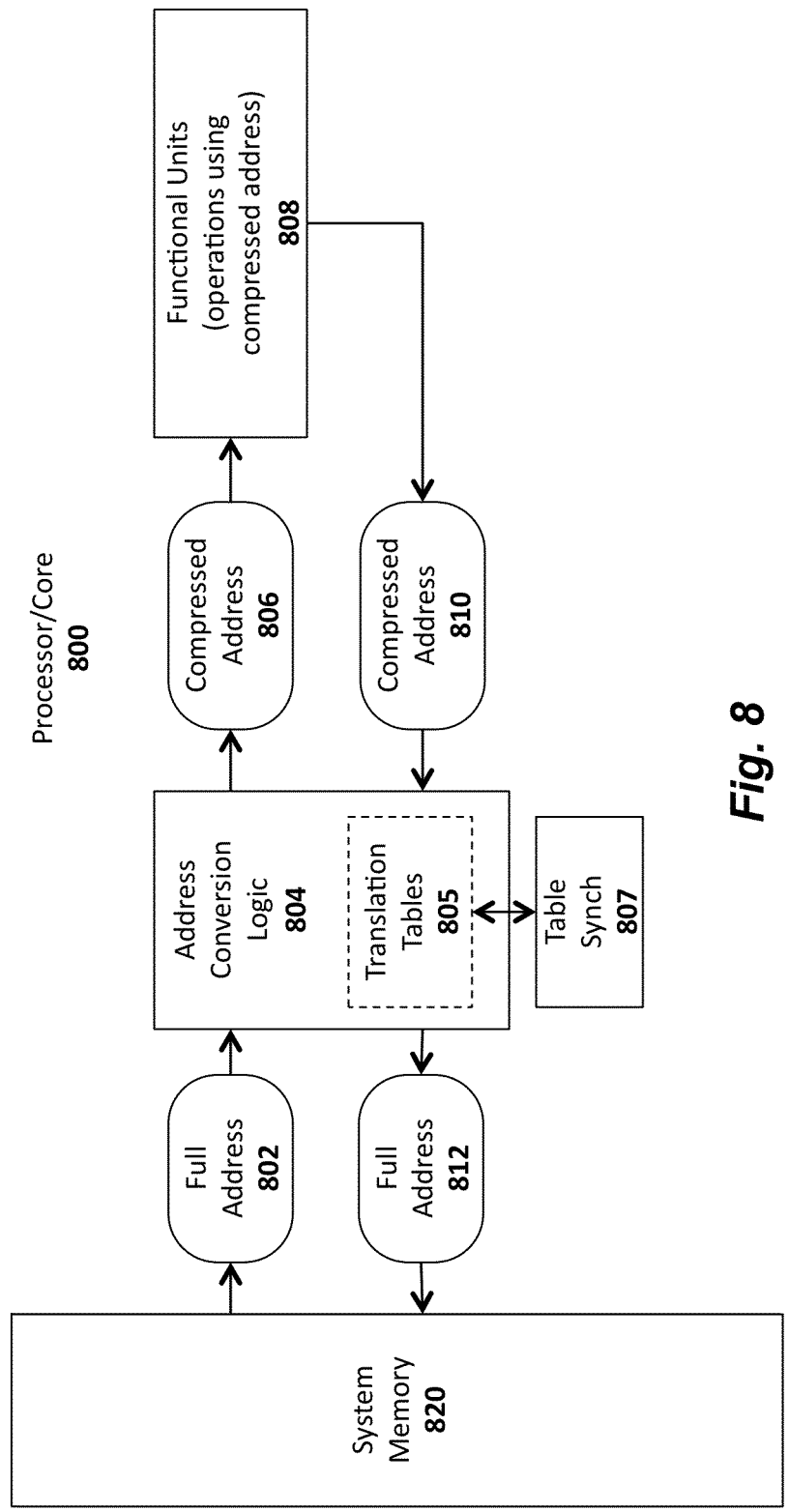
FIG. 8 illustrates one embodiment of an architecture for compressing and decompressing memory addresses.

One such embodiment is illustrated generally in FIG. 8, which shows address conversion logic 804 within a processor or core 800. The address conversion logic 804 includes one or more translation tables 805 for converting full addresses 802 to compressed addresses (also sometimes referred to as "internal" addresses). Functional units 808 within the processor/core 800 may then utilize the compressed address format when performing operations. The compressed address values 810 resulting from the internal operations may then be decompressed by the address conversion logic 804 (using one of the translation tables 805) to generate full addresses 812 for accessing external system memory 820. As discussed below, in one embodiment, table synchronization logic 807 synchronizes different copies of the same translation table 805 used at different pipeline stages of the processor/core 800.

Figure 9:
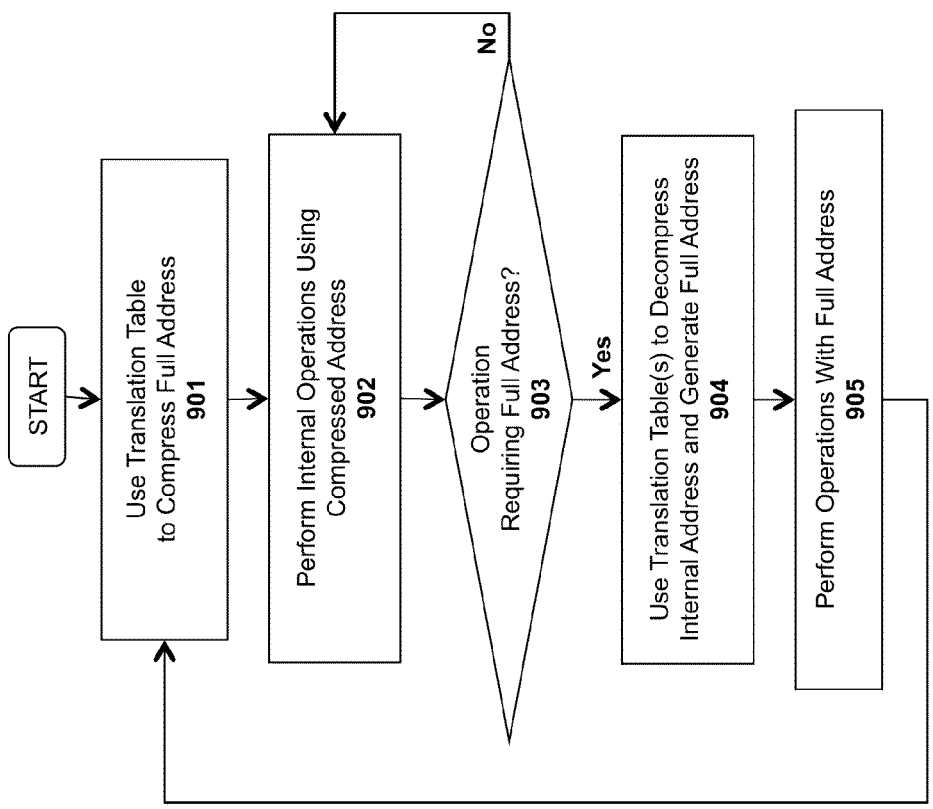
FIG. 9 illustrates one embodiment of a method for compressing and decompressing memory addresses.

A method in accordance with one embodiment is illustrated in FIG. 9. The illustrated method may be implemented within an architecture such as shown in FIG. 8, but is not limited to any particular architecture.

At 901, one of the translation tables is used to generate a compressed address from a full address. By way of example, a full address may comprise 57 bits and a compressed address may comprise 48 bits. In such a case, the compressed address may comprise a 3 bit pointer identifying an entry in the translation table, which stores the first 12 bits of the full address. A new entry may be allocated to the table if one does not already exist for the full address. It should be noted, however, that the underlying principles are not limited to any particular full/compressed address sizes or table/pointer sizes.

At 902, one or more internal operations are performed using the compressed address(es). For example, various mathematical or logical operations may be performed on data using the compressed addresses. If an operation (such as a load/store operation to system memory) requires a full address, determined at 903, then at 904 one of the translation tables are used to generate the full address. For example, the pointer value of the compressed address may be used to identify the bits of the full address stored within the translation table, which may then be appended in place of the pointer to generate the full address. In one embodiment, the pointer comprises an N-bit value and the portion of the full memory address comprises an M-bit value, where N<M. At 905, one or more operations are performed using the full address, and the process may then repeat starting at 901.

In one embodiment, the address compression techniques described herein are functionally transparent to software (e.g., the operating system (OS)) and reduce the CPU design cost of internal addressing structures. This is especially significant in front-end clusters that are heavily saturated with addresses and branch targets. These mechanisms provide a low-cost strategy for supporting any size address space based on market segment, while significantly reducing area, routing, speedpaths, and power.

Figure 10:
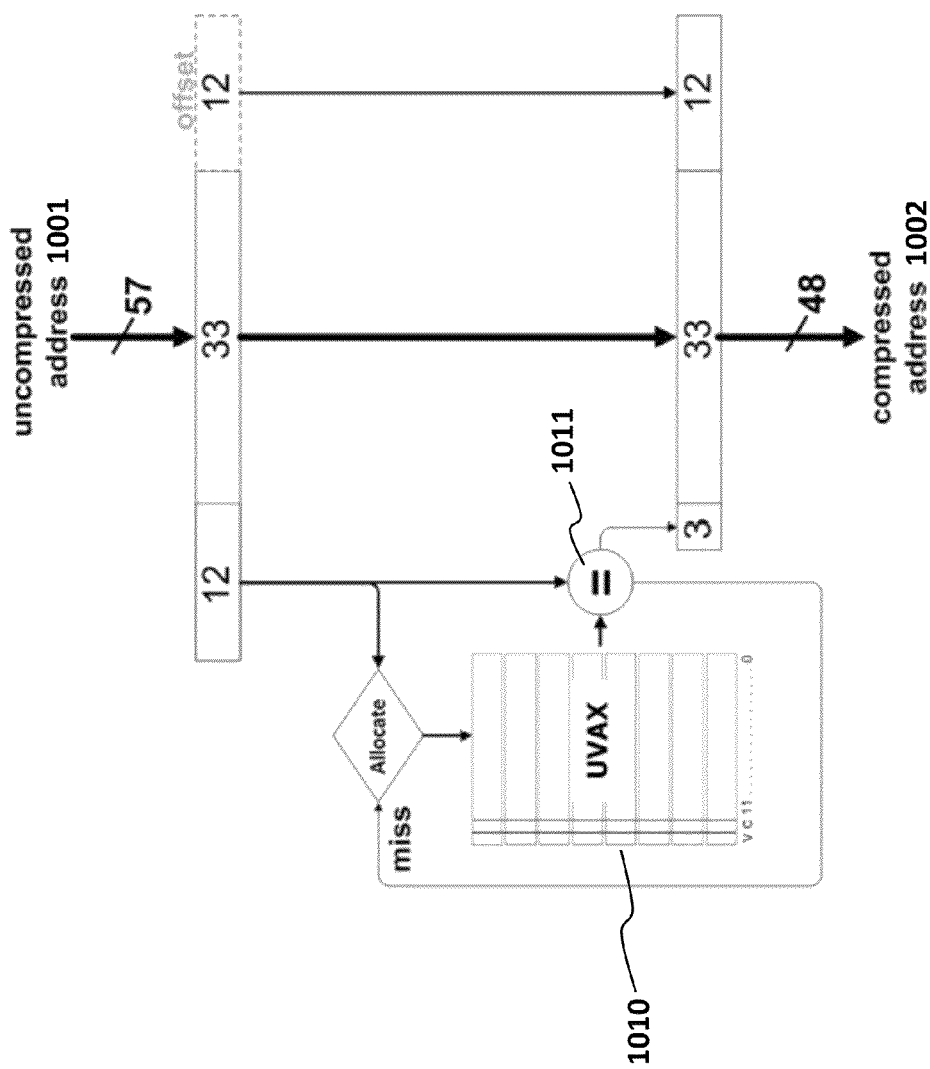
FIG. 10 illustrates one embodiment of compressing an address using a table.

FIG. 10 shows one particular embodiment in which an Upper-bit Virtual Address Translation (UVAX) table 1010 compresses a 57-bit address to a 48-bit internal address. The table contains 8 entries, so the upper 3 bits of the internal address may be implemented as a reference pointer to the associated UVAX entry. In one embodiment, a comparator 1011 compares the first 12 bits of the uncompressed address 1001 to determine if a match exists in the table 1010. If not, then a new entry is allocated in the table for this address and the associated 3-bit pointer is appended to the lower 45 bits of the address to generate the compressed address 1002. If a match exists, then the existing 3-bit pointer is used.

For instruction accesses in this example, compression may occur for direct branches to a new 45-bit address space, sequential fetches to the next 45-bit address space, or indirect branches where targets are read from a register. For data access, compression may occur after reading an architectural register but before accessing internal data caches. In one embodiment, separate structures (e.g., translation tables) are used for instruction and data accesses, since these accesses can occur simultaneously and independently.

In one embodiment, eviction of a UVAX entry from the table 1010 involves invalidation of the corresponding pointer in all internal structures. In one embodiment, each entry in the table 1010 includes a "valid" bit to indicate whether the current entry is valid. Invalid entries may then be overwritten with new entries. To reduce cost of tracking each pointer, a color mechanism can be used to flush partial structures, or all pointer structures can be flushed. For example, in one embodiment, internal address structures are flushed when valid translation table entries are deallocated.

Figure 11:
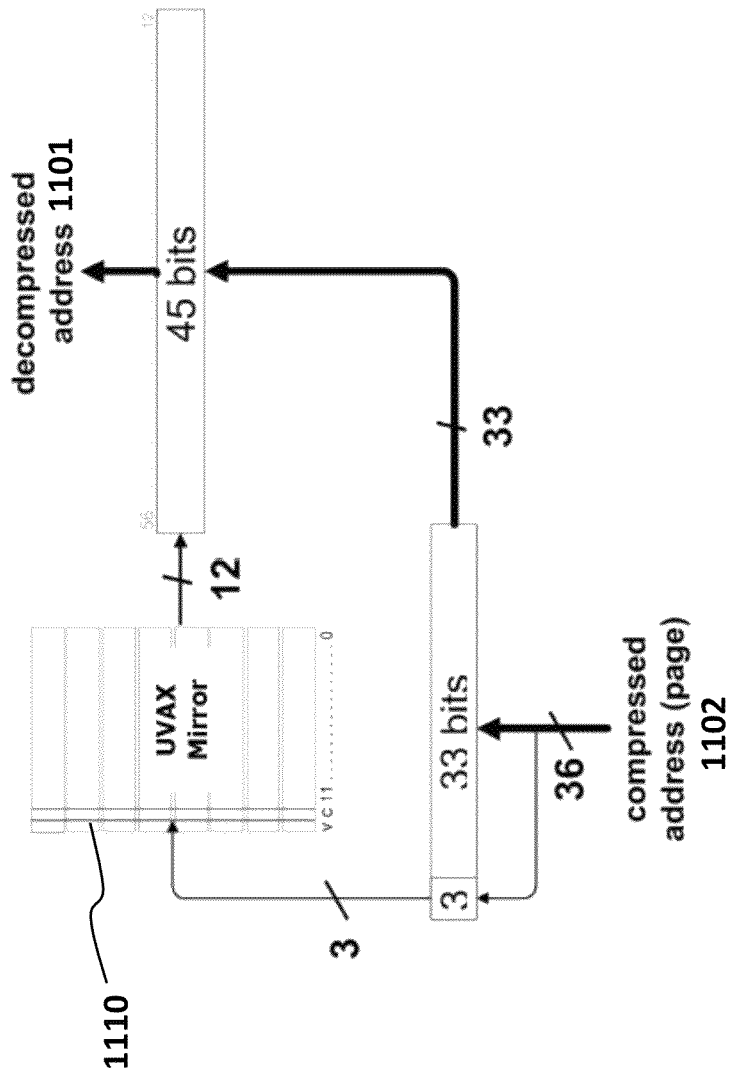
FIG. 11 illustrates one embodiment of decompressing an address using a table.

As mentioned, in one embodiment, "mirrors" of the translation tables may be stored and synchronized at different stages of the processor pipeline. For example, synchronization logic (not shown) may be used to synchronize the different mirror tables. FIG. 11 shows an address being decompressed by a UVAX table mirror 1110. This operation may be performed, for example, when a full address is needed to access external memory 820. This operation may also be performed to simplify various internal processes, such as the storage of addresses that reflect processor state, or execution of indirect branches in which the compressed value is available earlier.

In one embodiment the mirror 1110 is a duplicate of the master UVAX table, but physically located within the pipeline where decompression is needed. To avoid synchronization issues, the master UVAX tables may be located at the start of the instruction/data pipelines and/or where access is serialized for super-scalar architectures.

Figure 12:
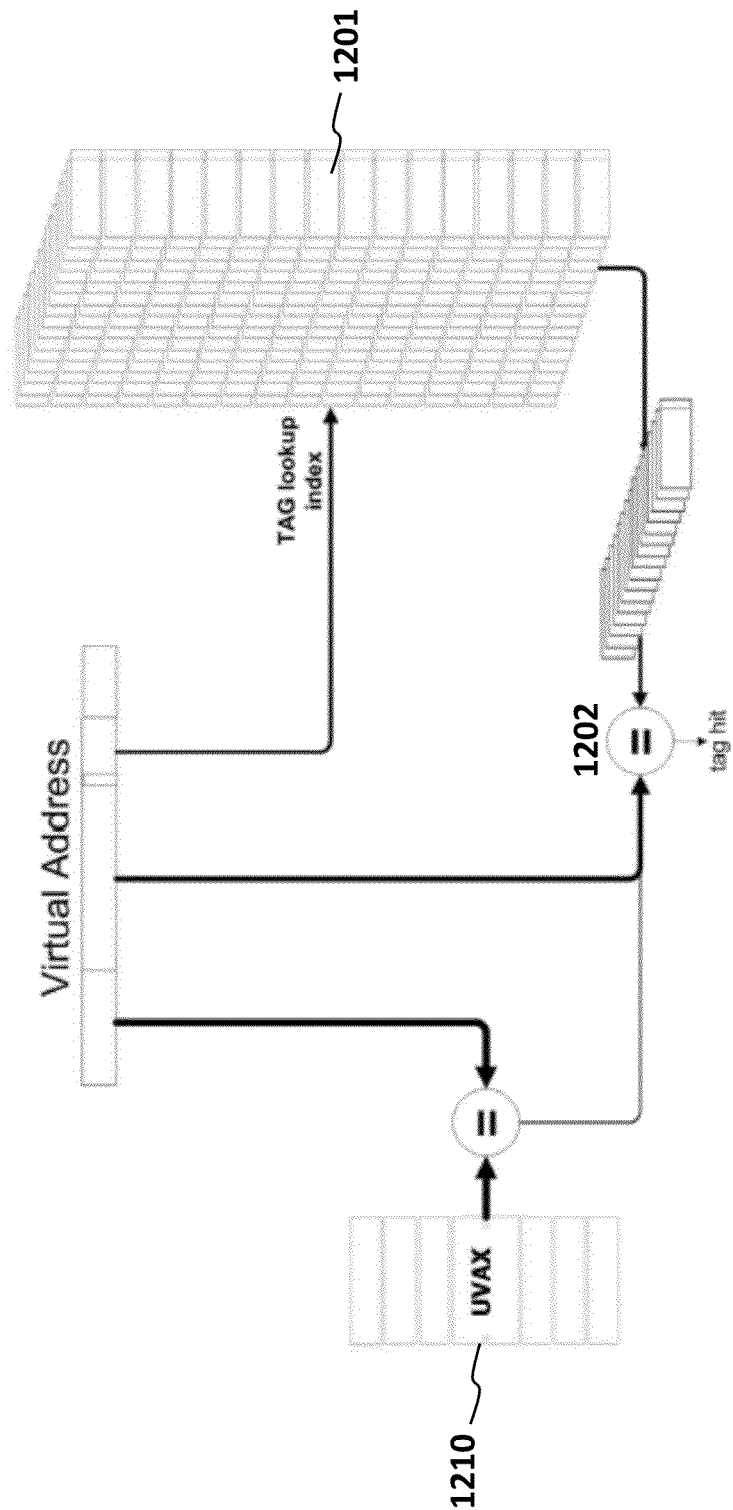
FIG. 12 illustrates an exemplary translation lookaside buffer (TLB) that was compressed using reference pointers to a table.

FIG. 12 shows a translation lookaside buffer (TLB) 1201 compressed using reference pointers to a UVAX table 1210. A tag lookup is performed using a tag lookup index and the results are compared against a tag portion of the virtual address combined with a UVAX table pointer. For example, a lookup is performed in the UVAX table 1210 to identify the pointer, which is then combined with the portion of the virtual address. A tag hit is generated by a comparator 1202 when the combined pointer and address match the TLB output. This example illustrates how a UVAX table may be used locally or independently for a specific address structure, and sized based on the behavior of the address structures it supports. A smaller UVAX table may be used to support only addresses within the CPU pipeline, while a larger UVAX table may be used to support large caches with prolonged retention.

Note that while the embodiments described above modify the width of virtual addresses, the underlying principles can be used for any address type (including physical addresses).

Embodiments may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   logic to generate one or more translation tables having a plurality of translation entries, each translation entry to include a pointer value and to store a portion of a full memory address usable within the processor to address data and instructions, wherein the translation tables comprise a first translation table and a second translation table, the first and second translation tables being located at different processor pipeline stages, and wherein the first translation table is used for converting from full memory addresses to compressed memory addresses, and the second translation table is used for converting from compressed memory addresses to full memory addresses; and
   address translation logic to use the translation tables to convert between the full address and a compressed version of the full address, the compressed version of the full address having the pointer value substituted for the portion of the full memory address,
   wherein a first portion of the processor is to perform operations using only the compressed version of the full address and a second portion of the processor is to perform operations using the full address when the full address is required.

2. The processor as in claim 1 further comprising:
   table synchronization logic to synchronize the first and second translation tables.

3. The processor as in claim 1 wherein the pointer comprises an N-bit value and the portion of the full memory address comprises an M-bit value, where N<M.

4. The processor as in claim 3 wherein N=3 and M=12.

5. The processor as in claim 1 wherein using the translation tables to convert between the full address and a compressed version of the full address comprises:

determining whether an entry exists for a portion of a full memory address;

if an entry exists, then using the pointer associated with that entry to create the compressed address; and if an entry does not exist, then creating a new entry and using the pointer associated with that new entry to create the compressed address.

6. The processor as in claim 5 wherein using the pointer to create the compressed address further comprises:

removing the portion from the full memory address; and
replacing the portion with the pointer.

7. The processor as in claim 1 further comprising:

a system memory addressable by the full memory address.

8. The processor as in claim 7 wherein the system memory is configured on a common die with the processor.

9. The processor as in claim 1 wherein internal address structures are flushed when valid translation table entries are deallocated.

10. The processor as in claim 1 comprising translation table tracking logic used to retain a subset of internal address structures when a translation table entry is deallocated.

11. A method comprising:

populating one or more translation tables with a plurality of translation entries, each translation entry including a pointer value and storing a portion of a full memory address usable within a processor to address data and instructions, wherein the translation tables comprise a first translation table and a second translation table, the first and second translation tables being located at different processor pipeline stages, and wherein the first translation table is used for converting from full memory addresses to compressed memory addresses, and the second translation table is used for converting from compressed memory addresses to full memory addresses; and using the translation tables to convert between the full address and a compressed version of the full address, the compressed version of the full address having the pointer value substituted for the portion of the full memory address, performing operations in a first portion of the processor using only the compressed version of the full address and performing operations in a second portion of the processor using the full address when the full address is required.

12. The method as in claim 11 further comprising:

synchronizing the first and second translation tables.

13. The method as in claim 11 wherein the pointer comprises an N-bit value and the portion of the full memory address comprises an M-bit value, where N <M.

14. The method as in claim 13 wherein N=3 and M=12.

15. The method as in claim 11 wherein using the translation tables to convert between the full address and a compressed version of the full address comprises:

determining whether an entry exists for a portion of a full memory address;

if an entry exists, then using the pointer associated with that entry to create the compressed address; and if an entry does not exist, then creating a new entry and using the pointer associated with that new entry to create the compressed address.

16. The method as in claim 15 wherein using the pointer to create the compressed address further comprises:

removing the portion from the full memory address; and
replacing the portion with the pointer.

\* \* \* \* \*